US011939496B2

(12) United States Patent
Luetzen et al.

(10) Patent No.: US 11,939,496 B2
(45) Date of Patent: Mar. 26, 2024

(54) CURABLE ADHESIVE COMPOSITION FOR MULTI-PURPOSE BONDING APPLICATIONS

(71) Applicant: Henkel AG & Co. KGaA, Duesseldorf (DE)

(72) Inventors: Hendrik Luetzen, Duesseldorf (DE); Patrick Seggewiss, Duesseldorf (DE); Thomas Kamm, Leverkusen (DE); Jose Garcia Miralles, Duesseldorf (DE); Olaf Hartmann, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 18/049,035

(22) Filed: Oct. 24, 2022

(65) Prior Publication Data

US 2023/0102757 A1  Mar. 30, 2023

Related U.S. Application Data

(63) Continuation of application No. PCT/EP2021/060057, filed on Apr. 19, 2021.

(30) Foreign Application Priority Data

May 6, 2020 (EP) .................... 20173137

(51) Int. Cl.
| | | |
|---|---|---|
| *C09J 171/02* | (2006.01) | |
| *B32B 7/12* | (2006.01) | |
| *B32B 15/04* | (2006.01) | |
| *B32B 15/18* | (2006.01) | |
| *B32B 15/20* | (2006.01) | |
| *B32B 21/04* | (2006.01) | |
| *B32B 27/08* | (2006.01) | |
| *B32B 27/30* | (2006.01) | |
| *B32B 27/36* | (2006.01) | |

(52) U.S. Cl.
CPC ............. *C09J 171/02* (2013.01); *B32B 7/12* (2013.01); *B32B 15/043* (2013.01); *B32B 15/18* (2013.01); *B32B 15/20* (2013.01); *B32B 21/042* (2013.01); *B32B 27/08* (2013.01); *B32B 27/302* (2013.01); *B32B 27/304* (2013.01); *B32B 27/308* (2013.01); *B32B 27/365* (2013.01); *B32B 2255/06* (2013.01); *B32B 2255/08* (2013.01); *B32B 2255/10* (2013.01); *B32B 2255/26* (2013.01)

(58) Field of Classification Search
CPC ........ C09J 171/02; B32B 7/12; B32B 15/043; B32B 15/18; B32B 15/20; B32B 21/042; B32B 27/08; B32B 27/302; B32B 27/304; B32B 27/308; B32B 27/365; B32B 2255/06; B32B 2255/08; B32B 2255/10; B32B 2255/26
USPC ....................................................... 524/555
See application file for complete search history.

(56) References Cited

U.S. PATENT DOCUMENTS

| | | | |
|---|---|---|---|
| 5,270,433 A | 12/1993 | Klauck et al. | |
| 5,426,148 A * | 6/1995 | Tucker .................... | C09K 3/10 525/425 |
| 6,040,368 A * | 3/2000 | Maver ................ | C09D 133/062 524/110 |
| 6,602,958 B2 * | 8/2003 | Briggs ........................ | C09J 4/06 525/193 |
| 8,790,632 B2 * | 7/2014 | Arthur .................. | A61L 24/043 424/78.17 |
| 10,138,262 B2 * | 11/2018 | Balijepalli .......... | C08G 65/3311 |
| 2015/0087817 A1 * | 3/2015 | Balijepalli .......... | C08G 65/3311 536/18.2 |

FOREIGN PATENT DOCUMENTS

| | | | | |
|---|---|---|---|---|
| DE | 102009045197 A1 | 4/2011 | | |
| EP | 2865701 A1 | 4/2015 | | |
| WO | 9509209 A1 | 4/1995 | | |
| WO | WO-9509209 A1 * | 4/1995 | ......... | C09D 133/062 |
| WO | 2019120923 A1 | 6/2019 | | |

OTHER PUBLICATIONS

Witzman et al. "Comparison of Methods for the Preparation of Acetoacetylated Coating Resins", Journal of Coatings Technology, vol. 62, No. 789, Oct. 1990.
Witzeman et al. "Transacetoacetylation with tert-butyl acetoacetate: Synthetic Applications", J. Org. Chemistry 1991, 56, 1713-1718.
International Search Report for International PCT Patent Application No. PCT/EP2021/060057 dated Jul. 15, 2021.

* cited by examiner

*Primary Examiner* — Michael M. Bernshteyn
(74) *Attorney, Agent, or Firm* — James E. Piotrowski

(57) ABSTRACT

The present invention relates to a curable adhesive composition based on acetoacetate compound, and to its use in multi-purpose bonding applications. In particular, the present invention relates to a curable adhesive composition based on a multifunctional acetoacetate compound and polyoxyalkylene polyamines.

19 Claims, No Drawings

CURABLE ADHESIVE COMPOSITION FOR MULTI-PURPOSE BONDING APPLICATIONS

The present invention relates to a curable adhesive composition based on acetoacetate compound, and to its use in multi-purpose bonding applications. In particular, the present invention relates to a curable adhesive composition based on multifunctional acetoacetate compound and polyoxyalkylene polyamines.

Multi-purpose adhesives, also known as universal adhesives, are used for bonding a number of substrates encountered in industrial manufacturing or home use, such as paper, cardboard, photographs, fabrics, leather, felt, bast, cork, films, metals such as aluminium and steel, china, ceramics, glass, wood, and various plastics such as PVC. Such adhesives are expected to produce an adequate adhesive effect on these various substrates, which differ chemically and physically in their surface structure and which are normally subjected to a special surface treatment before bonding.

Compared with the large variety of classes and types of adhesive used in industry and workshops, only a few substances are capable of meeting the stringent demands imposed on the universality of a multi-purpose adhesive. Among others, polyvinyl acetate and its copolymers are widely used.

The demand or universality represents a particularly difficult selection criterion for an adhesive composition. In the end, the adhesive composition must show equally high affinity for polar and apolar surfaces. Accordingly, the statement that a certain substance is suitable to be used in an adhesive does not indicate to the expert whether it can also be used in a universal adhesive composition. Therefore, efforts have been made to solve the demand.

For examples, U.S. Pat. No. 6,602,958 B2 discloses two-part room-temperature curing methacrylate based adhesives that are used to bond a wide variety of materials, including thermoset plastics, thermoplastics, metals, wood, ceramics and other materials and combinations of materials. It is reported to involve a significant improvement in the ability of adhesives to bond certain difficult-to-bond composite materials with minimum required surface preparation.

DE 102009045197 A1 discloses an aqueous adhesive comprising a component (a) containing poly(meth)acrylic acid and/or at least one (meth)acrylic acid copolymer, and a component (b) containing at least one polyurethane having at least one component capable of salt formation by releasing a proton in water, which is suitable to be used as a multi-purpose adhesive.

U.S. Pat. No. 5,270,433 A discloses a universal household adhesive composition comprising a substantially clear and solvent-free, aqueous, one-component polyurethane dispersion containing the reaction products of (a) a polyol mixture comprising polypropylene glycol, (b) a mixture of polyfunctional isocyanates comprising α,α,α',α'-tetramethyl xylene diisocyanate, (c) a functional component capable of salt formation in aqueous solution, and (d) optionally, a chain-extending agent.

It is therefore an object of the present invention to provide an adhesive composition alternative having safer toxicological profile for multi-purpose bonding applications.

This object is solved by a curable adhesive composition comprising a multifunctional acetoacetate compound and at least two polyoxyalkylene polyamines, which has a fixture time of no more than 5 minutes, and excellent adhesion performance in bonding substrates made of various materials such as metal, wood, plastics, etc.

In one aspect, the present invention relates to a curable adhesive composition, comprising:
- a multifunctional acetoacetate compound,
- a polyoxypropylene polyamine, and
- a polyoxyalkylene polyamine having oxyalkylene units selected from at least two of oxypropylene unit, oxyethylene unit, and oxytetramethylene unit.

In another aspect, the present invention relates to a two-part curable adhesive composition comprising, a first part comprising a multifunctional acetoacetate compound, and a second part comprising a polyoxypropylene polyamine, and a polyoxyalkylene polyamine having oxyalkylene units selected from at least two of oxypropylene unit, oxyethylene unit, and oxytetramethylene unit.

In yet another aspect, the present invention relates to the use of the curable adhesive composition or the two-part curable adhesive composition in bonding substrates made of or having a surface of paper, fabrics, leather, metal, china, ceramics, glass, wood, or plastics.

Further preferred embodiments of the invention are set out in the claims.

In the present specification, the terms "a" and "an" and "at least one" are the same as the term "one or more" and can be employed interchangeably.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules.

If reference is made herein to a molecular weight of a polymer or its components, this reference refers to the average number molecular weight $M_n$, if not explicitly stated otherwise. The number average molecular weight $M_n$ can be determined by gel permeation chromatography with THF as the eluent. If not stated otherwise, all given molecular weights are those determined by end group analysis. The weight average molecular weight $M_w$ can be determined by GPC, as described for $M_n$.

All percentages given herein in relation to the compositions or formulations relate to weight % relative to the total weight of the respective composition or formula, if not explicitly stated otherwise.

According to the present invention, the curable adhesive composition comprises a multifunctional acetoacetate compound, a polyoxypropylene polyamine, and a polyoxyalkylene polyamine having oxyalkylene units selected from at least two of oxypropylene unit, oxyethylene unit, and oxytetramethylene unit. The inventors have surprisingly found that the curable adhesive composition is suitable for bonding various types of substrates such as paper, fabrics, leather, metal, china, ceramics, glass, wood, or plastics.

The developed curable adhesive composition has excellent adhesion properties for multi-purpose bonding and a mild toxicologic profile compared to standard epoxy based or (meth)acrylate based formulations. Based on the acetylacetonate resin curing with the polyether amine hardener, a formulation having no longer than 5 min fixture time was developed that can be applied e.g. from a two-part cartridge and cured to a tough polymer. Strong adhesion and cohesion were found for bonding of metals, various plastics and wood. The rheology behavior and the mixing ratio can be adjusted by filler and improved mechanical resistance was observed by introduction of the filler particles into the formulation.

The curable adhesive composition is formulated to provide a cured product having a lap shear strength of no less than 10 MPa in bonding steel substrates.

The curable adhesive composition is formulated to provide a cured product having a lap shear strength of no less than 10 MPa in bonding aluminium substrates.

The curable adhesive composition is formulated to provide a cured product having a lap shear strength of no less than 7 MPa in bonding wood substrates.

The curable adhesive composition is formulated to provide a cured product having a lap shear strength of no less than 5 MPa in bonding polycarbonate (PC) substrates.

The curable adhesive composition is formulated to provide a cured product having a lap shear strength of no less than 3 MPa in bonding polyvinyl chloride (PVC) substrates.

The curable adhesive composition is formulated to provide a cured product having a lap shear strength of no less than 4 MPa in bonding poly(methyl methacrylate) (PMMA) substrates.

The curable adhesive composition is formulated to provide a cured product having a lap shear strength of no less than 3 MPa in bonding acrylonitrile-butadiene-styrene (ABS) substrates.

In addition, the curable adhesive composition has other advantages. For example, the adhesive composition is solvent-free, catalyst-free, has a workable viscosity and pot life and also cures quickly even at room temperature. Finally, the curable adhesive composition provides a strong adhesive bond that is resistant to humidity and chemicals such as acetone, ethyl acetate, 2-propanol, methyl ethyl ketone, ethanol and toluene.

According to the present invention, the multifunctional acetoacetate compound may have at least two acetoacetoxy groups, preferably 2 to 10 acetoacetoxy groups, and more preferably 2 to 4 acetoacetate groups. As such, this component may comprise either a single compound having at least two acetoacetoxy groups or a mixture of two or more compounds each having at least two acetoacetoxy groups. Each said compound should desirably be characterized by a number average molecular weight ($M_n$) of less than 12000 g/mol, for example less than 10000 g/mol or less than 6000 g/mol.

In a preferred embodiment, the curable adhesive composition comprises at least one acetoacetylated polyol, said acetoacetylated polyol being obtainable in accordance with the following equation (Reaction 1):

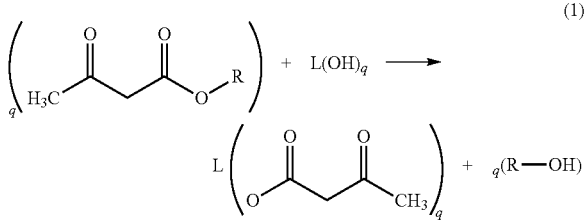

wherein: R is a $C_1$-$C_{12}$ alkyl group;
L denotes the backbone structure of the polyol; and,
$q \geq 2$.

Reaction 1 above may be described as the transesterification—or more specifically the transacetylation—of a polyol with an acetoacetate compound as defined in Formula (I) below:

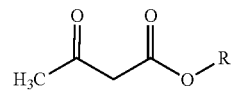

Formula (I)

wherein R is said $C_1$-$C_{12}$ alkyl group. More typically, the constituent alkyl group R has from 1 to 8 and, preferably, from 1 to 6 carbon atoms. Exemplary alkyl acetoacetates include: t-butyl acetoacetate; isobutyl acetoacetate; n-butyl acetoacetate; isopropyl acetoacetate; n-propyl acetoacetate; ethyl acetoacetate; and, methyl acetoacetate. t-Butyl acetoacetate is preferred herein.

The polyol of Reaction 1 above is denoted by Formula (II) herein below:

$$L\text{-}(OH)_q \qquad \text{Formula (II)}$$

wherein $q \geq 2$ and L denotes the backbone structure. Such polyols (II) may optionally include heteroatoms in their backbone or in pendent side chains. Further, the polyol (II) may be a monomeric polyhydric alcohol or may possess an oligomeric or polymeric backbone. Irrespective of this, it is preferred that the polyol (II) has a number average molecular weight ($M_n$) of less than 12000 g/mol; and, an hydroxyl functionality, q, of from 2 to 10, preferably from 2 to 4.

In one embodiment, the curable adhesive composition comprises an acetoacetylated polyol obtained from a monomeric polyhydric alcohol. Examples of suitable monomeric polyhydric alcohols include but are not limited to: 1,2-butanediol; 1,3-butanediol; 1,4-butanediol; 2,3-butanediol; 2,4-pentanediol; butyl ethyl propane diol; 1,4-hexanediol; 1,4-cyclohexane dimethanol; pentaerythritol; dipentaerythritol; trimethylolethane; trimethylolpropane; ditrimethylolpropane; tricyclodecane dimethanol; hydroquinone bis(2-hydroxyethyl) ether; alkylene glycols, such as ethylene glycol, diethylene glycol, propylene glycol, dipropylene glycol, butylene glycol, pentamethylene glycol, hexamethylene glycol, hexylene glycol and neopentyl glycol; glycerol; castor oil; castor wax; sugars such as glucose, sucrose, fructose, raffinose, maltodextrose, galactose, xylose, maltose, lactose, mannose and erythrose; sugar alcohols such as erythritol, xylitol, malitol, mannitol and sorbitol; and, hydroxyalkylated aliphatic diamines such as o,o'-bis(diethanolaminomethyl)-p-nonylphenol, N,N,N,N'-tetra(2-hydroxypropyl)ethylenediamine (Quadrol L, available from BASF) and N,N,N,N-tetra(2-hydroxyethyl)ethylenediamine. In a preferred embodiment, the multifunctional acetoacetate compound is an acetoacetylated polyol obtained from glycerol, trimethylolpropane, ethanol isosorbide, neopentylglycol, pentaerythritol, di-methylolpropane, di-pentaerythritol, propoxylated monosaccharides, trimethylol ethane, and a combination thereof.

The present invention also does not preclude such multifunctional acetoacetate compound from comprising an acetoacetylated polyol obtained from an oligomeric or polymeric polyhydric alcohol. In particular, the polyol (II) may be selected from the group consisting of: polyoxyalkylene polyols, also called polyether polyols; polyester polyols, including polycaprolactone polyols; polyesteramide polyols; polycarbonate polyols; polybutadiene polyols; polyurethane polyols; polyacrylate polyols; and, combinations thereof. Desirably such oligomeric or polymeric polyols should be characterized by: a number average molecular weight (Mn) of at most 10000 g/mol and preferably from 250 to 6000 g/mol. Further, the use of one or more polyether polyols or polyester polyols as the starting material is of particular interest. And a commercial example of a polyether polyol is Voranol CP260 (available from DowDuPont).

As is known in the art, polyester polyols can be prepared from condensation reactions of polybasic carboxylic acids or anhydrides and a stoichiometric excess of polyhydric alcohols, or from a mixture of polybasic carboxylic acids, monobasic carboxylic acids and polyhydric alcohols. Suitable polybasic carboxylic acids and anhydrides for use in preparing the polyester polyols include those having from 2 to 18 carbon atoms and in particular those having from 2 to 10 carbon atoms. Non-limiting examples of such polybasic carboxylic acids and anhydrides include: adipic acid; glutaric acid; succinic acid; malonic acid; pimelic acid; sebacic acid; suberic acid; azelaic acid; 1,4-cyclohexane dicarboxylic acid; phthalic acid; phthalic anhydride; isophthalic acid; terephthalic acid; tetrahydrophthalic acid; hexahydrophthalic acid; and, combinations thereof. Monobasic carboxylic acids which can be used include those having from 1 to 18 carbon atoms or, preferably from 1 to 10 carbon atoms, of which the following examples might be mentioned: formic acid; acetic acid; propionic acid; butyric acid; valeric acid; caproic acid; caprylic acid; capric acid; lauric acid; myristic acid; palmitic acid; stearic acid; and, combinations thereof. Suitable polyhydric alcohols have from 2 to 18 carbon atoms and desirably from 2 to 10 carbon atoms. Exemplary polyhydric alcohols include, but are not limited to: ethylene glycol; propylene glycol; hexane-1,6-diol; trimethylol propane; glycerol; neopentyl glycol; pentaerythritol; butylene glycol; 2-methyl-1,3-propane diol; hexylene glycol; and combinations thereof.

Polyether polyols may be produced by processes known in the art, such as the reaction of alkene oxides with polyhydric starter molecule in the presence of an appropriate catalyst, such as an alkali metal hydroxide, alkali metal alkoxide or antimony pentachloride. Examples of the alkene oxides include: tetrahydrofuran; ethylene oxide; 1,2-propylene oxide; 1,2- and 2,3-butylene oxide; and, styrene oxide. And examples of suitable starter molecules include but are not limited to: water; ethylene glycol; 1,2- and 1,3-propanediols; 1,4-butanediol; diethylene glycol; and, trimethylolpropane. Preferred polyether polyols for use herein are: poly(propylene oxide) polyol; poly(ethylene oxide) polyol; PTMEG; and mixtures thereof.

Polycarbonate polyols for use herein can be selected from, but are not limited to polycarbonate diols. Such polycarbonate diols may be produced by the reaction of a diol with dialkyl or diaryl carbonates or phosgene. The reactant diols may be selected from, but are not limited to: 1,2-propanediol; 1,3-propanediol; 1,4-butanediol; 1,5-pentanediol; 1,6-hexanediol; diethylene glycol; trioxyethylene glycol; and, mixtures thereof. An exemplary diaryl carbonate is diphenyl carbonate.

The transesterification (transacetylation) Reaction 1 may be conducted by conventional methods as known in the art of polymer chemistry. Reference in this regard may be made to inter alia: Witzman et al. "*Comparison of Methods for the Preparation of Acetoacetylated Coating Resins*", Journal of Coatings Technology, Vol. 62, No. 789, October 1990; and, Witzeman et al. "*Transacetoacetylation with tert-butyl acetoacetate: Synthetic Applications*", J. Org. Chemistry 1991, 56, 1713-1718. Typically, the reaction between the oligomeric or polymeric polyol and the acetoacetate will involve mixing said polyol and acetoacetate in a suitable vessel, either with or without solvent, at an elevated temperature of, for example, from 50° C. to 200° C. or from 80° C. to 150° C.; preferably, the reaction is performed in the absence of solvent. The reaction is driven towards completion by distilling off the alcohol (R—OH) formed under reduced pressure. Moreover, the reaction can be conducted in the presence of a catalytic amount of a transesterification catalyst of which suitable examples include, but are not limited to, calcium acetate, zinc acetate, bismuth acetate, lead oxide and trichloroacetic acid.

Whilst the product of the above described transacetylation reaction may be used directly in the present multi-purpose adhesive composition, that reaction product may equally be first isolated and purified using methods known in the art. Mention in this regard may be extraction, evaporation, distillation and chromatography as suitable techniques.

According to the present invention, the curable adhesive composition also comprises a polyoxypropylene polyamine. The polyoxypropylene polyamine refers to a polyamine only having oxypropylene units in the backbone structure.

In one preferred embodiment, the polyoxypropylene polyamine is selected from polyoxypropylene diamine, polyoxypropylene triamine, and combination thereof.

Examples of the polyoxypropylene diamine are those represented by formula (1),

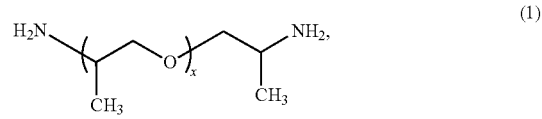

wherein x is from 2 to 100, preferably from 2 to 80.

Preferably, the polyoxypropylene diamine has a number averaged molecular weight of from 100 to 5,000, and more preferably from 200 to 4,000.

Such polyoxypropylene diamines are commercially available as Jeffamine D series polyether polyamines such as D-230, D-400, D-2000 and D-4000 from Huntsmann.

Examples of the polyoxypropylene triamine are those represented by formula (2),

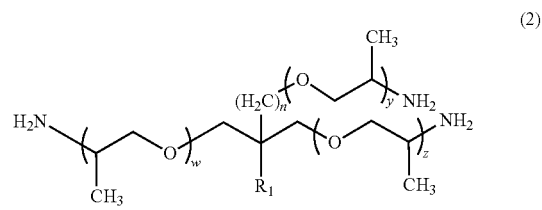

wherein n is from 0 to 6, w, y and z are each independently from 1 to 100, and more preferably from 1 to 80, the sum of w, y and z is from 3 to 100, and preferably from 5 to 85, $R_1$ is hydrogen or a linear or branched $C_1$ to $C_{16}$ alkyl group, and preferably is hydrogen or a linear or branched $C_1$ to $C_8$ alkyl group.

Preferably, the polyoxypropylene triamine has a number averaged molecular weight of from 100 to 8,000, and more preferably from 200 to 6,000.

Such polyoxypropylene triamines are commercially available as Jeffamine T series polyether polyamines such as T-403, T-3000 and T-5000 from Huntsmann.

According to the present invention, the curable adhesive composition also comprises a polyoxyalkylene polyamine having oxyalkylene units selected from at least two of oxypropylene unit, oxyethylene unit, and oxytetramethylene unit.

In one embodiment, the polyoxyalkylene polyamine has oxypropylene units and oxyethylene units in the backbone structure. Such polyoxyalkylene polyamines can be represented by the formula (3)

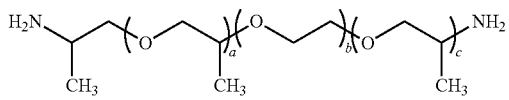

wherein a is from 0 to 10, b is from 2 to 60, c is from 0 to 10, and sum of a and c is from 2 to 20.

Preferably, such polyoxyalkylene polyamine having oxypropylene units and oxyethylene units has a number averaged molecular weight of from 100 to 5,000, and more preferably from 200 to 3,000.

Such polyether polyamines are commercially available as Jeffamine ED series polyether polyamines such as ED-600, ED-900 and ED-2003 from Huntsmann.

In another embodiment, the polyoxyalkylene polyamine has oxypropylene units and oxytetramethylene units in the backbone structure.

Preferably, such polyoxyalkylene polyamine having oxypropylene units and oxytetramethylene units has a number averaged molecular weight of from 100 to 3,000, and more preferably from 200 to 2,000.

Such polyether polyamines are commercially available as Jeffamine THF series polyether polyamines such as THF-100, THF-140 and THF-170 from Huntsmann.

Optionally, the curable adhesive composition comprises at least one amine curing promoter having from 1 to 10, for example from 2 to 6 or from 2 to 4 primary and/or secondary amino groups in accordance with Formula (III) herein below:

$R^2R^3NH$            Formula (III)

wherein: $R^2$ is hydrogen or a $C_1$-$C_6$ alkyl group; and,
$R^3$ is a hydrocarbyl group having up to 36 carbon atoms which contains aromatic groups, which hydrocarbyl group is optionally substituted by one or more —$NHR^2$ groups and is further optionally interrupted by one or more O atoms and/or by one or more —$N(R^4)$— groups of which $R^4$ is a hydrogen atom; or,
$R^3$ is a $C_1$-$C_{36}$ aliphatic group which is optionally substituted by one or more —$NHR^2$ groups and which is further optionally interrupted by one or more O atoms and/or by one or more —$N(R^4)$— groups of which $R^4$ is a hydrogen atom; and,
$R^2$ and $R^3$ may form a ring together with the N-atom to which they are bound.

For completeness, where $R^2$ and $R^3$ form a ring, it will be recognized that such a ring may be heterocyclic and that it may include one or more nitrogen atoms.

Good results have also been obtained wherein the reactant amine according to Formula (III) is characterized in that: $R^2$ is hydrogen; and, $R^3$ is a $C_1$ to $C_{36}$ alkyl group preferably a $C_1$ to $C_{12}$ alkyl group which is optionally substituted with at least one —$NHR^2$ group and which is optionally interrupted by one or more —$N(R^4)$— groups of which $R^4$ is a hydrogen atom. Exemplary di-primary amines of this embodiment include: tetramethylene diamine; pentamethylene diamine; hexamethylene diamine; octamethylene diamine; and, dodecamethylene diamine. Exemplary primary-secondary diamines of this embodiment include: N-methylethylenediamine; N-ethylethylenediamine; N-methyl-1,3-diaminopropane; 2-(isopropylamino)ethylamine; N-propylethylenediamine; N-propyl-1,3-propanediamine; N-cyclohexyl-1,3-propanediamine; 4-(aminomethyl)piperidine; 3-(aminomethyl)piperidine; 2-(aminomethyl)piperidine; and, 4-aminopiperidine.

Further exemplary commercial amines for use in the present invention include but are not limited to: 2-methyl-1,5-diaminopentane available as Dytek A from Invista Arpadis; 1,2-diaminocyclohexane, available as a mixture of isomers as Dytek DCH-99 from Invista Arpadis; N,N'-dimethyl hexanediamine (MAHMA) available from Sigma-Aldrich; fatty acid dimer based diamines available as Priamine 1071, 1073, 1074 and 1075 from Croda; phenalkamines available as Cardolite NX-5608, NX-5607 and LITE 3060 available from Cardolite Corporation; polyethyleneimines (PEI) available under the trade names Lupasol G 20 (waterfree) and Lupasol FG from BASF, and isophorone diamine from Sigma-Aldrich.

And still further exemplary amines suitable for use in composition of the present invention include: piperidine and pyrollidine.

In certain circumstances it may be beneficial for the amine curing promoter to include a primary amine according to Formula (III) which is characterized in that $R^2$ is hydrogen and $R^3$ is a $C_1$ to $C_{12}$ alkyl group, preferably a $C_1$ to $C_6$ alkyl group. Exemplary amines of this type include: n-butylamine; n-hexylamine; n-octylamine; n-decylamine; and, n-dodecylamine.

In one preferred embodiment, the amine curing promoter is a cycloaliphatic amine, preferably selected from isophorone diamine, menthane diamine, 1,2-diaminocyclohexane, 1,3-diaminocyclohexane, 1,4-diaminocyclohexane, 1,3-di(aminomethyl)cyclohexane, 4,4'-methylene dicyclohexylamine, 4,4'-diaminodicyclohexylmethane, 3,3'-dimethyl-4,4'-diaminodicyclohexyl-methane, and combinations thereof.

If present, the molar equivalent ratio of the amine groups in the amine curing promoter to the amine groups in the polyether polyamines ranges from 1:10 to 10:1, preferably from 1:5 to 5:1, and more preferably from 1:3 to 3:1.

It is noted that the composition of the present invention can comprise a large excess of either amines from the polyether polyols and the amine curing promoter (if present) or said acetoacetate. The composition may, for example, be broadly characterized by a molar equivalent ratio of acetoacetate to amine of from 1:10 to 10:1. However, the total amount of amines in the composition of the present composition is generally selected such that the molar equivalent ratio of acetoacetate to amine may be in the range from 2:1 to 1:2, for example from 1.2:1 to 0.8:1. Thus, while it is preferred that one mole of amine be available for every acetoacetate equivalent in the composition, variances about this preferred 1:1 equivalent ratio can be tolerated.

An advantage of the chemistry of the present curable composition is that its rate of curing can be tuned or moderated to control the rate of development of the mechanical properties of the cured material on various types of substrates. For example, a fast curing reaction and concomitant fast development of those mechanical properties can be advantageous in multi-purpose bonding applications.

To form the multi-purpose curable adhesive composition, the reactive components are brought together and mixed in such a manner as to induce the hardening thereof. More particularly, the components may be mixed in pre-determined amounts by hand, by machine, by (co-)extrusion or by any other means which can ensure fine and highly homogeneous mixing thereof. Upon initial mixing—"initial" meaning herein up to 1 minute after the components are combined—the curable adhesive composition is a liquid or paste at room temperature. This fact does not however preclude the mixing temperature being above room temperature, for example up to 15° C. above room temperature.

The curable adhesive composition may, of course, contain adjunct ingredients and additives. However, the adhesive compositions should broadly be formulated to exhibit an initial viscosity suitable for a paste or liquid material. In case of the adhesive compositions comprising no fillers, it ranges from less than 30000 mPa·s, preferably less than 15000 mPa·s and more preferably less than 7500 mPa·s at 25° C. In case of the adhesive compositions comprising fillers, it ranges from less than 2000 Pa·s, preferably less than 1000 Pa·s, and more preferably less than 500 Pa·s.

Independently of or additional to said viscosity characteristics, the curable adhesive composition should be formulated to be bubble (foam) free upon mixing and subsequent curing. Moreover, the curable adhesive composition should further be formulated to demonstrate at least one, desirably at least two and most desirably all of the following properties: i) a fixture strength after curing the composition for 5 minutes; ii) a maximum exotherm temperature of no greater than 120° C., preferably no greater than 100° C. and more preferably no greater than 80° C.; and, iii) a Shore A hardness of at least 50, preferably at 60 and more preferably at least 70 after being cured and stored for 7 days at room temperature and 50% relative humidity.

The composition of the present invention may be solvent-free. In the alternative, the composition may comprise one or more solvents, of which at least one said solvent is preferably miscible with water. It is therefore envisaged that the composition may be characterized by a solvent system consisting of two or more solvents that are miscible with water. Equally, the composition may be characterized by a solvent system consisting of at least one solvent that is immiscible with water and at least one solvent that is miscible with water. For completeness, the term "immiscible" as used herein means that in some proportion two phases are present.

Non-limiting examples of solvents miscible with water include, without limit, acetic acid, acetone, acetonitrile, dimethylformamide, dimethyl sulfoxide, dioxane, ethanol, methanol, n-propanol, isopropanol, and tetrahydrofuran. Non-limiting examples of solvents that are immiscible with water include benzene, n-butanol, butyl acetate, carbon tetrachloride, chloroform, cyclohexane, 1,2-dichloroethane, dichloromethane, ethyl acetate, di-ethyl ether, heptane, hexane, methyl-1-butyl ether, methyl ethyl ketone, pentane, di-isopropyl ether, toluene, trichloromethane, xylene, and combinations thereof.

When used, the amount of solvent present in the composition may be determined based on normal practical considerations. In general, however, the volume to mass ratio of the solvent to the acetoacetate functionalized compound(s) will be in the range from 1:1 to 100:1. In some embodiments, the volume to mass ratio of the solvent to the acetoacetate functionalized compound(s) may be in range from 1:1 to 50:1.

The compositions of the present invention may, of course, also contain standard additives such as pigments, fillers, plasticizers, levelling agents, foam suppressing agents, rheology control agents, catalysts, anti-oxidants, tackifiers, adhesion promoters, flame retardants and, UV-stabilizers. The choice of appropriate additives is limited only in that these must be compatible with the other components of the composition and cannot be deleterious to the use of the composition in the multi-purpose bonding applications.

When fillers are employed, they should typically be included in an amount of up to 75% by weight, for example up to 50 wt. % or up to 30 wt. %, based on the weight of the composition. Suitable for use as fillers herein are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, aluminum trihydroxide, magnesium hydroxide, and other ground mineral substances. Organic fillers can also be used, in particular carbon black, graphite, rubber particles, wood fibers, wood flour, sawdust, cellulose, melamine, cotton, pulp, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler.

In certain embodiments, plasticizers may be included to moderate the softness and flexibility of the cured curable adhesive composition. One or more plasticizers may in this case be selected from the group consisting of: vegetable oil; mineral oil; soybean oil; terpene resins; aromatic esters such as dioctyl phthalate, diundecyl phthalate, tricresyl phosphate and triisononyl mellitate; linear esters such as di-tridecyl adipate; chlorinated paraffin; aromatic and napthenic process oils; alkyl naphthalenes; and, low molecular weight polyisoprene, polybutadiene, mono-functional and long chain containing amines or polybutylene resins. Conventionally, the amount of plasticizer should be from 0 to 20 wt. %, preferably from 0 to 10 wt. % or from 0 to 5 wt. % based on the total weight of the multi-purpose adhesive composition.

The curing reaction of the composition can be catalyzed. Known catalysts include, for instance, stannous octoate, stannous dioleate, stannous palmitate, stannous oxalate, boron trifluoride etherate and Broensted acids. And, where used, the amount of catalyst—as determined in the absence of any applicable support—should be from 0.001 to 5 wt. %, preferably from 0.01 to 2 wt. % by weight, based on the total weight of reactant amine used. However, it is highly preferred that the present composition is free of catalysts.

Organofunctional silanes, such as mercaptofunctional, epoxyfunctional and in particular aminofunctional silanes, may preferably be used as adhesion promoters to improve the adhesion on metals. Examples of mercaptofunctional silanes are 3-mercaptopropyl trimethoxysilane or 3-mercaptopropyl triethoxysilane or their alkyl dimethoxy or alkyl diethoxy analogues. As examples of aminofunctional silanes, 3-aminopropyl alkoxysilanes, 2'-aminoethyl-3-aminopropyl alkoxysilanes may be mentioned. Epoxyfunctional silanes may be selected from a large number of compounds. By way of example, the following may be mentioned: 3-glycidyl oxymethyl trimethoxysilane, 3-glycidyl oxymethyl triethoxysilane, 3-glycidoxymethyl tripropoxysilane, 3-glycidoxymethyl tributoxysilane, 2-glycidoxyethyl trimethoxysilane, 2-glycidoxyethyl triethoxysilane, 2-glycidoxyethyl tripropoxysilane, 2-glycidoxyethyl tributoxysilane, 2-glycidoxyethyl trimethoxysilane, 1-glycidoxyethyl triethoxysilane, 1-glycidoxyethyl tripropoxysilane, 1-glycidoxyethyl tributoxysilane, 3-glycidoxypropyl trimethoxysilane, 3-glycidoxypropyl triethoxysilane, 3-glycidoxypropyl tripropoxysilane, 3-glycidoxypropyl tributoxysilane, 2-glycidoxypropyl trimethoxysilane, 2-glycidoxypropyl triethoxysilane, 2-glycidoxypropyl tripropoxysilane, 2-glycidoxypropyl tributoxysilane, 1-glycidoxypropyl trimethoxysilane, 1-glycidoxypropyl triethoxysilane, 1-glycidoxypropyl tripropoxysilane, 1-glycidoxypropyl tributoxysilane, 3-glycidoxybutyl trim ethoxysilane, 4-glycidoxybutyl triethoxysilane, 4-glycidoxybutyl tripropoxysilane, 4-glycidoxybutyl tributoxysilane, 4-glycidoxybutyl trimethoxysilane, 3-glycidoxybutyl triethoxysilane, 3-glycidoxybutyl tripropoxysilane, 3-alpropoxybutyl tributoxysilane, 4-glycidoxybutyl trimethoxysilane, 4-glycidoxybutyl triethoxysilane, 4-glycidoxybutyl tripropoxysilane, 1-glycidoxybutyl trimethoxysilane, 1-glycidoxybutyl triethoxysilane, 1-glycidoxybutyl tripropoxysilane, 1-glycidoxybutyl tributoxysilane, (3,4-epoxycyclohexyl)methyl trimethoxysilane, (3,4-epoxycyclohexyl)methyl trimethoxysilane, (3,4-epoxycyclohexyl)methyl tripropoxysilane, (3,4-epoxycyclohexyl)methyl tributoxysilane, (3,4-epoxycyclohexyl)ethyl trimethoxysilane, (3,4-epoxycyclohexyl)ethyl triethoxysilane, (3,4-epoxycyclohexyl)ethyl tripropoxysilane, (3,4-epoxycyclohexyl)ethyl tributoxysilane, (3,4-epoxycyclohexyl)propyl trimethoxysilane, (3,4-epoxycyclohexyl)propyl triethoxysilane, (3,4-epoxycyclohexyl)propyl tripropoxysilane, (3,4-epoxycyclohexyl)propyl tributoxysilane, (3,4-epoxycyclohexyl)butyl trimethoxysilane, (3,4-epoxycyclohexyl)butyl triethoxysilane, (3,4-epoxycyclohexyl)butyl tripropoxysilane, (3,4-epoxycyclohexyl)butyl tributoxysilane. The adhesion promoters are preferably used in the composition in amounts between 0.1 and 10% by weight, preferably between 0.5 and 4% by weight, especially preferably between 0.5 and 2% by weight.

Flame retardants may be added in the adhesive composition according to the present invention to improve the performance of the cured product especially when it is used for wood bonding. Examples of the flame retardants are ammonium polyphosphate, triphenylphosphine oxide, aluminum triethyl phosphinate, zinc diethyl phosphinate, melamine cyanurate, melamine phosphate, melamine polyphosphate, melamine pyrophosphate, melamine ammonium polyphosphate, melamine ammonium pyrophosphate, melamine borate, triphenyl phosphate, resorcinol bis-(diphenyl phosphate), bisphenol A-bis-(diphenyl phosphate), resorcinal-bis-(2.6-dixylylenylphosphate), aluminum hydroxide, aluminum hydroxide, magnesium dihydroxide, zinc oxide, molybdenum trioxide, antimony oxide, aluminum trihydroxide, zinc borate, calcium silicate, magnesium silicate, calcium sulfate, magnesium carbonate, dihydroxaphosphaphenantren, dihydroxaphosphaphenantren-hydroquinone, potassium diphenyl sulphone sulphonate, poly methyl phenyl siloxane, potassium-butyl perfluoro sulfonate and mixtures thereof. The flame retardants are preferably used in the composition in amounts between 0.1 and 20% by weight, preferably between 0.5 and 15% by weight, especially preferably between 0.5 and 10% by weight.

In another aspect, it is directed to a two-part curable adhesive composition, comprising a first part comprising a multifunctional acetoacetate compound, and a second part comprising a polyoxypropylene polyamine, and a polyoxyalkylene polyamine having oxyalkylene units selected from at least two of oxypropylene unit, oxyethylene unit, and oxytetramethylene unit.

The ingredient(s) in each part is stored in a container (part) separate from the other until the contents of all the containers are mixed together to form the mixture of the adhesive composition prior to the application. Upon applying and curing, a solid material forms in the bonding area.

Another embodiment of the invention is the method of using the curable adhesive composition of the present invention to adhere substrates to each other. In this embodiment, the curable composition is applied to a first substrate. The method of application may be by a number of ways known to those having ordinary skill in the art (for example brushing, spraying, roller coating, rotogravure coating, flexographic coating, flow coating, dipping, and combinations thereof) to form a continuous or discontinuous film of the composition, as desired. In some embodiments, the curable composition will be applied at ambient temperature (approximately 25° C.); alternatively, the curable composition may be applied at elevated temperature.

After the composition has been applied to the first substrate, it may then be contacted with another substrate to form a composite. The composite so formed is optionally subjected to applied pressure, such as passing it between rollers to effect increased contact of the substrates with the composition. In another embodiment of the invention, the composition may be simultaneously or sequentially applied to both surfaces of the first substrate, which composition are then simultaneously or sequentially bonded to two further substrates, which may be the same, or different. It is further contemplated that the composite construction may sequentially be bonded to other substrate(s) using the composition of the invention, or a different composition before or after the process described herein. The first and second substrates to be bonded in the method of this invention may be the same or different and include, for example paper, fabrics, leather, metal (such as aluminum and steel), china, ceramics, glass, wood, or plastics such as (PP, PC, PVC, etc.), which may have smooth or structured surfaces and may be provided in the form of rolls, sheets, films, foils etc.

In some embodiments of the present invention, the substrates are relatively thin and flat, and the resulting composites are called laminates. The substrates may be constructed in multi-ply laminate structures based upon polyalkylenes, such as polyethylenes, and polypropylenes, polyesters, and polyamides (nylon), metalized polypropylene, aluminum foil, etc. Examples of two-ply laminate constructions, include polypropylene/polypropylene, polyester/nylon, polyester/polyethylene, polypropylene/metallized polypropylene, polypropylene/aluminum foil, polyester/aluminum foil, polyamide/aluminum foil, etc.

It is contemplated that the curable adhesive composition of the present invention will undergo a chemical reaction, called here "cure". While the invention is not limited to any particular theory, it is believed that cure begins when the curable composition is formed and that it continues at least until the end of the pot life, and may continue after that. In some embodiments, before the end of the pot life, a layer of the curable adhesive composition will be applied to a substrate. In some of these embodiments, at least one further substrate will be contacted with the layer of curable mixture; often, the further substrate will be contacted with the layer curable adhesive composition before the end of the pot life. Thus, in some embodiments, the cure will not finish until after the curable adhesive composition and the substrates are in contact. It is contemplated that the cured product will form a useful adhesive bond between the substrates.

While the invention is particularly useful as an adhesive, it is contemplated that it is also applicable to coatings, polymeric foams, sealants, and elastomers. When used as a coating, the curable adhesive composition will be applied to a substrate and then allowed to cure, and further substrates will not be brought into contact with the curable mixture. When used as a sealant, foam, or elastomer, the curable adhesive composition may, for example, be placed in a mold or on a release surface and allowed to cure; the cured mixture could then be removed from the mold or release surface and used as intended.

Various features and embodiments of the disclosure are described in the following examples, which are intended to be representative and not limiting.

EXAMPLE

Materials
Jeffamine D-230 is a polyoxypropylene diamine having a number average molecular weight of about 230 from Huntsmann.
Jeffamine T-403 is a polyoxypropylene triamine having a number average molecular weight of about 440 from Huntsmann.
Jeffamine ED-600 is a polyoxypropylene polyoxyethylene diamine having a number average molecular weight of about 600 from Huntsmann.
Jeffamine ED-900 is a polyoxypropylene polyoxyethylene diamine having a number average molecular weight of about 900 from Huntsmann.
Jeffamine THF100 is a polyoxypropylene polyoxytetramethylene diamine having a number average molecular weight of about 1000 from Huntsmann.
Priamine 1071 is a dimer fatty acid diamine from Croda.
Jeffamine EDR148 is diamine having follow structure from Huntsmann.

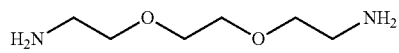

Dytek DCH-99 is 1,2-diaminocyclohexane from Invista Arpadis.
(3-aminopropyl)trimethoxysilane is an adhesion promoter from Alfa Aesar.
Omya BLH is a grounded calcium carbonate from Omya.
Aerosil R202 is a hydrophobic fumed silica from Evonik.

Test Methods

Lap Shear Strength
The samples were made from two 25 mm wide substrates using a 10 mm overlap. Samples were fixed in place with clamps and cured at room temperature for 2 days before testing. Testing was performed using a Zwick/Roell Z050, pulling at 10 mm/min speed.

Fixture Strength
Fixture strength was evaluated as "pass" if the samples were not separate under their own weight when the clamps of the lap shear samples were removed after 5 min curing.

Resistance to Solvents
Bulk polymers of the two component formulations were prepared by mixing all components and curing at room temperature for 7 days. Solvent resistance was tested by using a paper tissue, soaked with different solvents, that was rubbed multiple times back and forth over the surface of the cured bulk polymer. Solvent resistance was rated as "pass" if no change of the polymer surface was visible.

Synthesis of Trimethylolpropane Triacetoacetate
The synthesis of trimethylolpropane triacetoacetate (AATMP) was carried out according to literature procedure WO 2019/120923A1 with slight modifications. A 500 mL 3 neck round bottom flask was charged with trimethylolpropane or pentaerythritol (1 eq.) and TBAA (1.1 eq.). Then, a Y-adaptor, mechanical stirring bar and a reflux condenser were adapted in each neck of the flask. In the Y-adaptor a thermocouple and a nitrogen connector were adjusted. The temperature was set to 140° C. under nitrogen atmosphere (reflux reached 92° C. approximately for 4 h). After that, 8 hours distillation was performed at atmospheric pressure while the temperature slowly raised to 140° C. Finally, when the distillation ceased, 2 hours distillation at reduced pressure was done from 900 mbar to 400 mbar at 140° C. The reaction schemes are shown below.

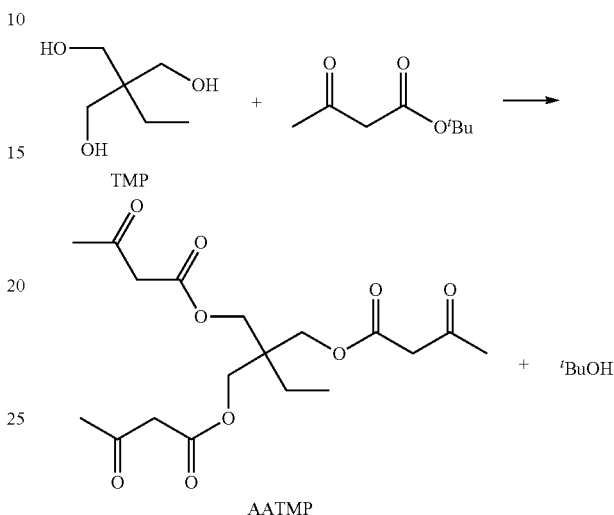

Example 1

0.175 eq. (20.83 g) Jeffamine D230, 0.65 eq. (37.11 g) 1,2-diaminocyclohexane, 0.15 eq. (46.65 g) Jeffamine ED600 and 0.025 eq. (4.48 g) (3-aminopropyl)trimethoxysilane were mixed in a PP speed mixer cup. Then 148.09 g Omya BLH and 16.45 g Aerosil R202 were added and mixed in the mixer cup. Finally, 1 eq. (128.80 g) of AATMP was added and mixed in the mixer cup. The mixture was then mixed in a speed mixer at 3500 rpm for 30 seconds to obtain an adhesive composition.

Example 2

0.175 eq. (27.65 g) Jeffamine T403, 0.65 eq. (37.11 g) 1,2-diaminocyclohexane, 0.15 eq. (46.65 g) Jeffamine ED600 and 0.025 eq. (4.48 g) (3-aminopropyl)trimethoxysilane were mixed in a PP speed mixer cup. Then 152.37 g Omya BLH and 16.93 g Aerosil R202 were added and mixed in the mixer cup. Finally, 1 eq. (128.80 g) of AATMP was added and mixed in the mixer cup. The mixture was then mixed in a speed mixer at 3500 rpm for 30 seconds to obtain an adhesive composition.

Example 3

0.175 eq. (20.83 g) Jeffamine D230, 0.65 eq. (37.11 g) 1,2-diaminocyclohexane, 0.15 eq. (74.03 g) Jeffamine ED900 and 0.025 eq. (4.48 g) (3-aminopropyl)trimethoxysilane were mixed in a PP speed mixer cup. Then 165.13 g Omya BLH and 18.34 g Aerosil R202 were added and mixed in the mixer cup. Finally, 1 eq. (128.80 g) of AATMP was added and mixed in the mixer cup. The mixture was then mixed in a speed mixer at 3500 rpm for 30 seconds to obtain an adhesive composition.

Example 4

0.175 eq. (20.83 g) Jeffamine D230, 0.65 eq. (37.11 g) 1,2-diaminocyclohexane, 0.15 eq. (76.43 g) Jeffamine THF100 and 0.025 eq. (4.48 g) (3-aminopropyl)trimethoxysilane were mixed in a PP speed mixer cup. Then 166.63 g Omya BLH and 18.51 g Aerosil R202 were added and mixed in the mixer cup. Finally, 1 eq. (128.80 g) of AATMP was added and mixed in the mixer cup. The mixture was then mixed in a speed mixer at 3500 rpm for 30 seconds to obtain an adhesive composition.

Example 5

0.15 eq. (18.30 g) Jeffamine D230, 0.57 eq. (32.61 g) 1,2-diaminocyclohexane, 0.25 eq. (77.75 g) Jeffamine ED600 and 0.025 eq. (4.48 g) (3-aminopropyl)trimethoxysilane were mixed in a PP speed mixer cup. Then 94.87 g Omya BLH and 8.50 g Aerosil R202 were added and mixed in the mixer cup. Finally, 1 eq. (128.80 g) of AATMP was added and mixed in the mixer cup. The mixture was then mixed in a speed mixer at 3500 rpm for 30 seconds to obtain an adhesive composition.

Comparative Example 1

0.2 eq. (23.80 g) Jeffamine D230, 0.65 eq. (37.11 g) 1,2-diaminocyclohexane, 0.15 eq. (44.06 g) Priamine 1071 were mixed in a PP speed mixer cup. Then 210.39 g Omya BLH and 23.38 g Aerosil R202 were added and mixed in the mixer cup. Finally, 1 eq. (128.80 g) of AATMP was added and mixed in the mixer cup. The mixture was then mixed in a speed mixer at 3500 rpm for 30 seconds to obtain an adhesive composition.

Comparative Example 2

0.25 eq. (29.75 g) Jeffamine D230, 0.65 eq. (37.11 g) 1,2-diaminocyclohexane and 0.10 eq. (7.85 g) Jeffamine EDR148 were mixed in a PP speed mixer cup. Then 183.16 g Omya BLH and 20.35 g Aerosil R202 were added and mixed in the mixer cup. Finally, 1 eq. (128.80 g) of AATMP was added and mixed in the mixer cup. The mixture was then mixed in a speed mixer at 3500 rpm for 30 seconds to obtain an adhesive composition.

The obtained adhesive compositions were tested for fixture strength and lap shear strength on various types of substrates. The results are shown in Table 1.

TABLE 1

| | Testing results | | | | | | |
| --- | --- | --- | --- | --- | --- | --- | --- |
| | Example 1 | Example 2 | Example 3 | Example 4 | Example 5 | Com. Ex. 1 | Com. Ex. 2 |
| Fixture strength | Pass | Pass | Pass | Pass | Pass | Pass | Pass |
| LSS on beech wood (MPa) | 14.87 | >10 | >10 | >10 | 18.47 | >10 | >10 |
| LSS on steel (MPa) | 18.93 | 17.50 | 16.33 | 16.40 | 15.40 | — | — |
| LSS on Al (MPa) | 20.43 | 20.40 | 15.83 | 18.63 | 16.40 | — | — |
| LSS on PC (MPa) | 6.82 | 7.21 | 8.44 | 8.00 | 10.33 | 1.74 | 0.97 |
| LSS on PMMA (MPa) | 5.17 | — | — | — | 6.84 | 2.10 | 0.55 |
| LSS on PVC (MPa) | 4.49 | 3.95 | 7.74 | 10.50 | 8.20 | — | — |
| LSS on ABS (MPa) | 4.43 | >4 | >4 | >4 | 4.87 | — | — |

In addition, the resistance of the examples to the solvents were also tested and all inventive examples exhibited no noticeable change after being rubbed with solvent-soaked paper tissue and passed the test.

It is evident from Table 1 that the inventive examples exhibited excellent fixture strength and lap shear strength on various types of substrates while the comparative examples could not achieve good adhesion performance in bonding plastics.

The invention claimed is:

1. A curable adhesive composition, comprising:
   multifunctional acetoacetate compound;
   a polyoxypropylene polyamine, and
   a polyoxyalkylene polyamine having oxyalkylene units selected from at least two of oxypropylene unit, oxyethylene unit, and oxytetramethylene unit.

2. The curable adhesive composition according to claim 1, wherein the multifunctional acetoacetate compound has at least two acetoacetoxy groups.

3. The curable adhesive composition according to claim 1, wherein the multifunctional acetoacetate compound has 3 to 4 acetoacetoxy groups.

4. The curable adhesive composition according to claim 1, wherein the multifunctional acetoacetate compound is an acetoacetylated polyol obtained from glycerol, trimethylolpropane, ethanol isosorbide, neopentylglycol, pentaerythritol, di-methylolpropane, di-pentaerythritol, propoxylated monosaccharides, trimethylol ethane, and combinations thereof.

5. The curable adhesive composition according to claim 1, wherein the polyoxypropylene polyamine is selected from polyoxypropylene diamine, polyoxypropylene triamine, and combinations thereof.

6. The curable adhesive composition according to claim 5, wherein the polyoxypropylene diamine is represented by formula (1),

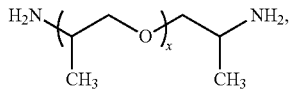
(1)

wherein x is from 2 to 100.

7. The curable adhesive composition according to claim 5, wherein the polyoxypropylene triamine is represented by formula (2)

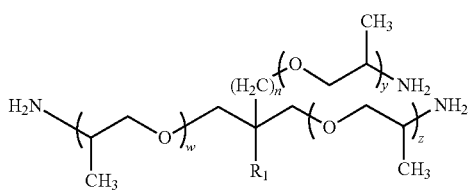
(2)

wherein n is from 0 to 6, w, y and z are each independently from 1 to 100, the sum of w, y and z is from 3 to 100, $R_1$ is hydrogen or a linear or branched $C_1$ to $C_{16}$ alkyl group.

8. The curable adhesive composition according to claim 1, wherein the polyoxyalkylene polyamine has the oxypropylene unit and the oxyethylene unit, and has a weight averaged molecular weight from 100 to 5,000.

9. The curable adhesive composition according to claim 1, wherein the polyoxyalkylene polyamine has the oxypropylene unit and the oxytetramethylene unit and has a weight averaged molecular weight from 100 to 5,000.

10. The curable adhesive composition according to claim 1, further comprising at least one amine curing promoter in accordance with Formula (3):

$$R^2R^3NH \quad (3)$$

wherein:

$R^2$ is hydrogen or a $C_1$-$C_6$ alkyl group; and $R^3$ is a hydrocarbyl group having up to 36 carbon atoms which contains aromatic groups, which hydrocarbyl group is optionally substituted by one or more —$NHR^2$ groups and is further optionally interrupted by one or more O atoms and/or by one or more —$N(R^4)$— groups of which $R^4$ is a hydrogen atom; or $R^3$ is a $C_1$-$C_{36}$ aliphatic group which is optionally substituted by one or more —$NHR^2$ groups and which is further optionally interrupted by one or more O atoms and/or by one or more —$N(R^4)$— groups of which $R^4$ is a hydrogen atom; and $R^2$ and $R^3$ can form a ring together with the N-atom to which they are bound.

11. The curable adhesive composition according to claim 1, wherein the molar equivalent ratio of acetoacetate to amine in the curable adhesive composition is in the range from 2:1 to 1:2.

12. The curable adhesive composition according to claim 1, wherein the molar equivalent ratio of acetoacetate to amine in the curable adhesive composition is 1:1.

13. The curable adhesive composition according to claim 1, further comprising one or more additives selected from the group consisting of pigment, filler, plasticizer, levelling agent, foam suppressing agent, rheology control agent, catalyst, anti-oxidant, tackifier, adhesion promoter, flame retardant, UV-stabilizer and combinations thereof.

14. The curable adhesive composition according to claim 1, wherein the curable adhesive composition is free of catalysts.

15. Cured products comprising the curable adhesive composition according to claim 1.

16. An article comprising a first substrate comprising or having a surface comprising paper, fabric, leather, metal, china, ceramic, glass, wood, or plastic disposed adjacent to a second substrate comprising or having a surface comprising paper, fabric, leather, metal, china, ceramic, glass, wood, or plastic and the curable adhesive composition according to claim 1 disposed between and in contact with the first substrate and the second substrate.

17. A two-part curable adhesive composition, comprising,
   a first part comprising a multifunctional acetoacetate compound, and
   a second part comprising a polyoxypropylene polyamine, and a polyoxyalkylene polyamine having oxyalkylene units selected from at least two of oxypropylene unit, oxyethylene unit, and oxytetramethylene unit.

18. Cured products comprising the two-part curable adhesive composition according to claim 17.

19. An article comprising a first substrate comprising or having a surface comprising paper, fabric, leather, metal, china, ceramic, glass, wood, or plastic disposed adjacent to a second substrate comprising or having a surface comprising paper, fabric, leather, metal, china, ceramic, glass, wood, or plastic and the two-part curable adhesive composition according to claim 17 disposed between and in contact with the first substrate and the second substrate.

\* \* \* \* \*